No. 834,637. PATENTED OCT. 30, 1906.
J. T. H. PAUL.
FILTER.
APPLICATION FILED AUG. 1, 1906.

4 SHEETS—SHEET 1.

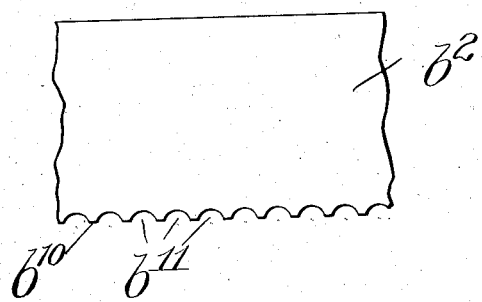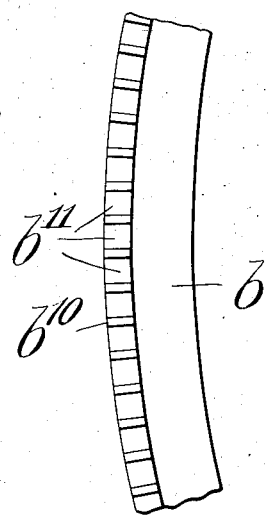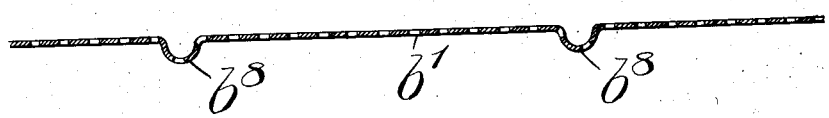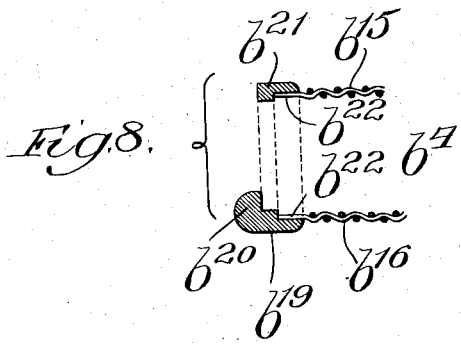

UNITED STATES PATENT OFFICE.

JOHN T. H. PAUL, OF CHICAGO, ILLINOIS, ASSIGNOR TO E. GOLDMAN & COMPANY, OF CHICAGO, ILLINOIS, A CORPORATION OF ILLINOIS.

FILTER.

No. 834,637.

Specification of Letters Patent.

Patented Oct. 30, 1906.

Application filed August 1, 1906. Serial No. 328,712.

*To all whom it may concern:*

Be it known that I, JOHN T. H. PAUL, a citizen of the United States, residing at Chicago, in the county of Cook and State of Illinois, have invented a new and useful Improvement in Filters, of which the following is a specification.

My invention relates particularly to filters for use in filtering liquors; and the primary object of the invention is to provide a filter of simple construction having a large capacity and thoroughly effective to cleanse the liquor passing through it.

The invention is illustrated in its preferred embodiment in the accompanying drawings, in which—

Figure 1:
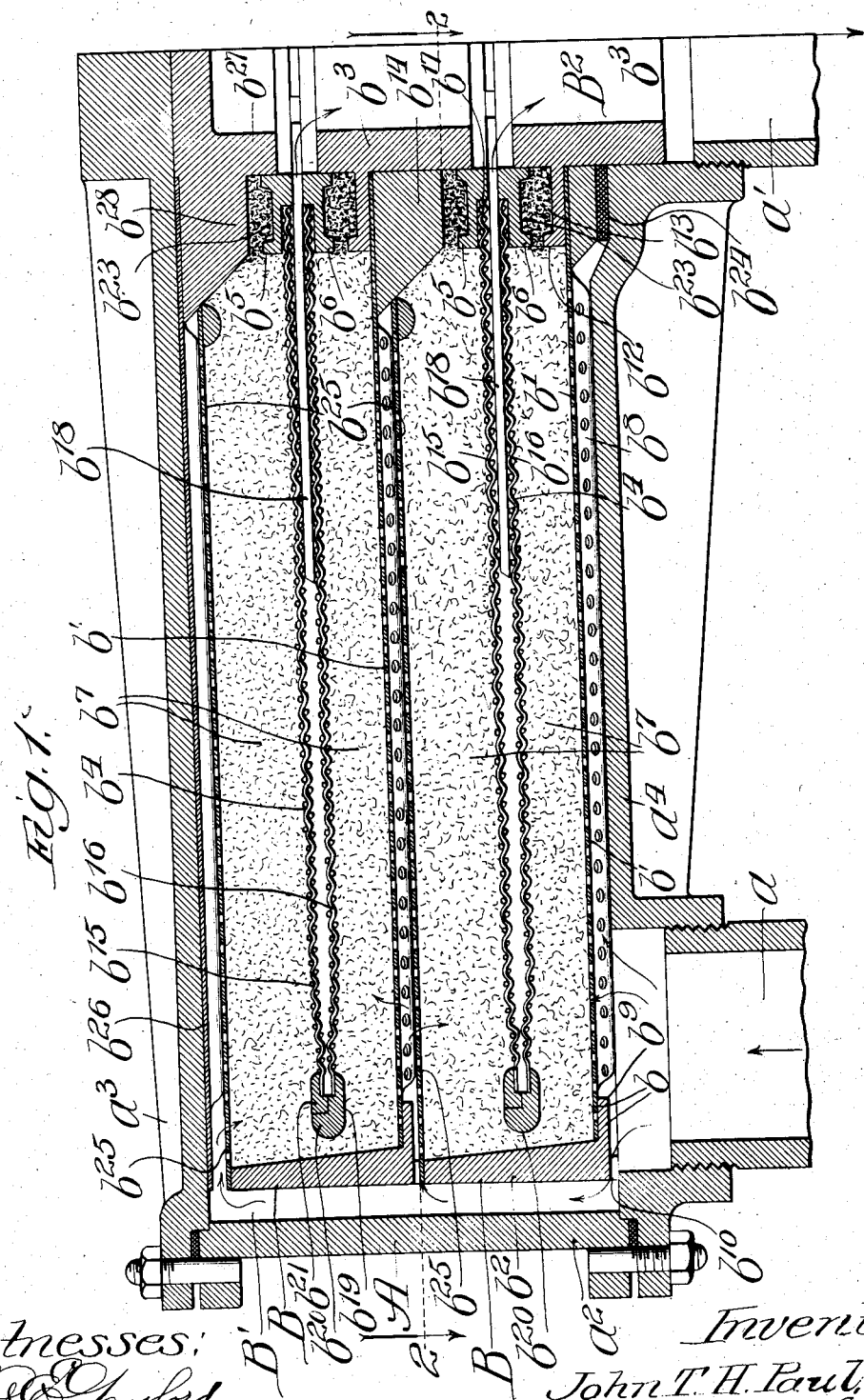
Figure 2:
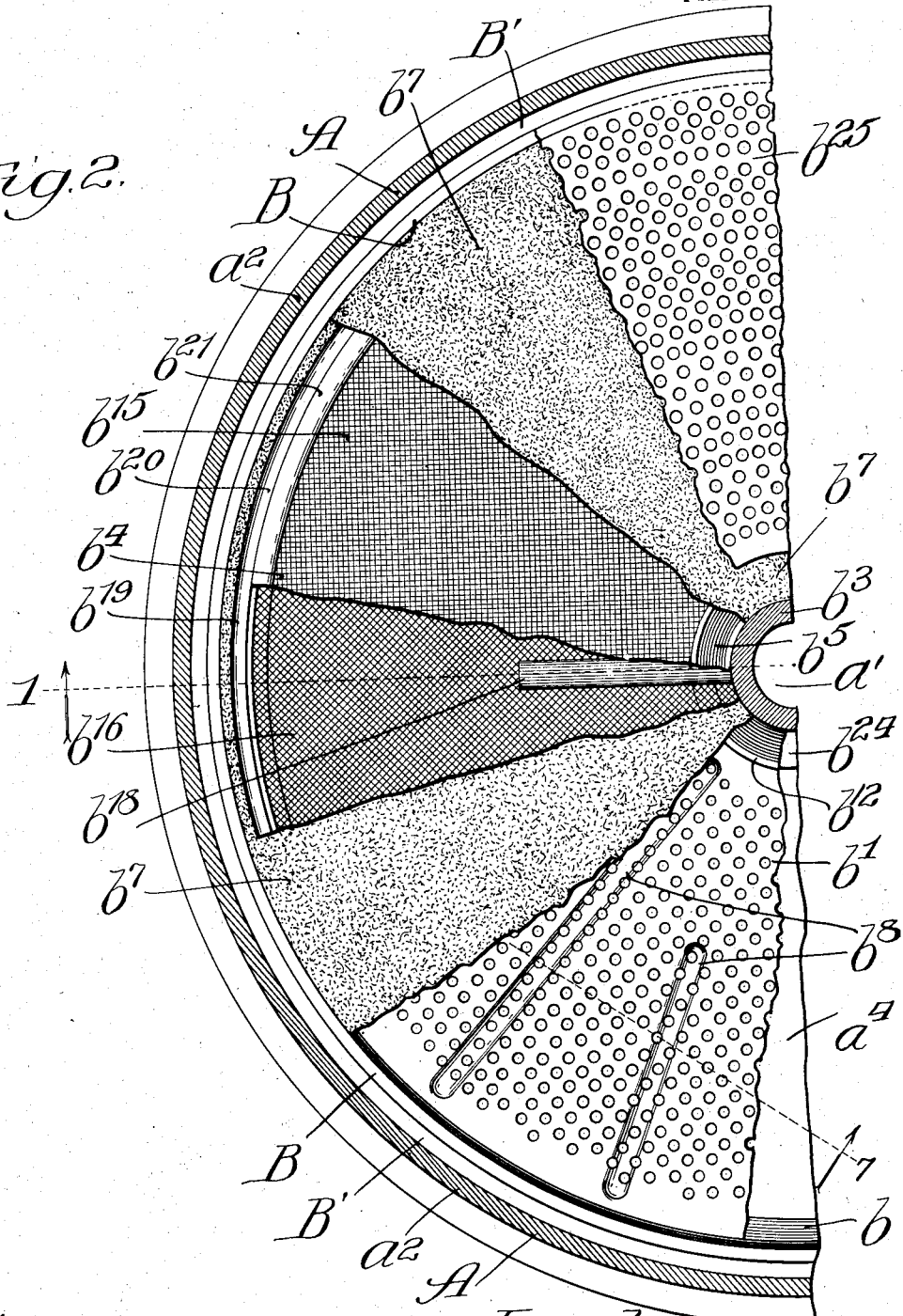
Figure 3:
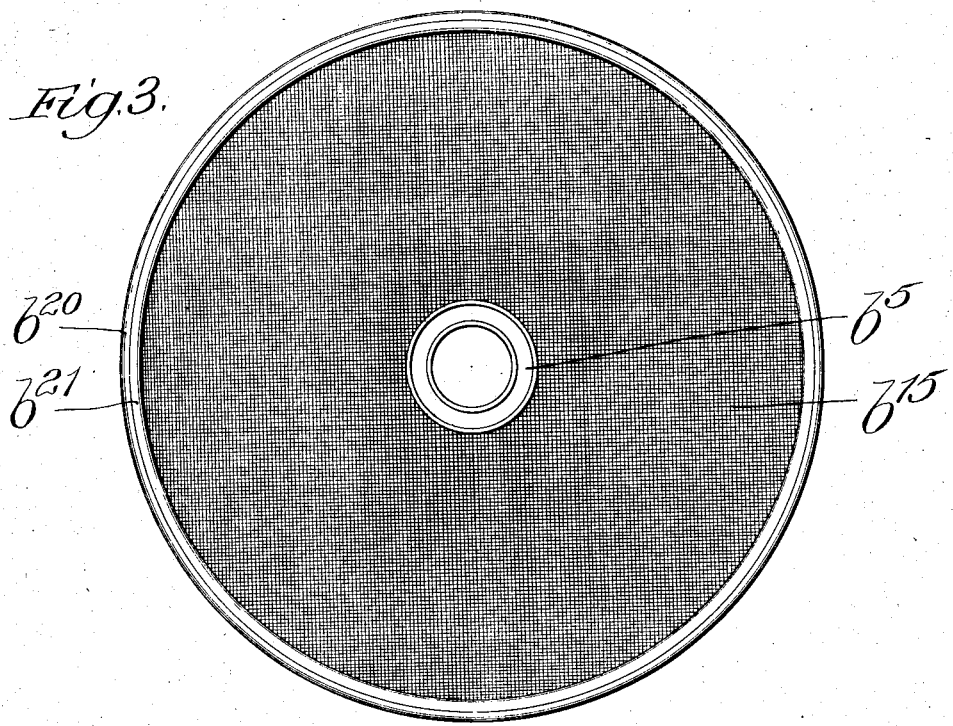
Figure 4:
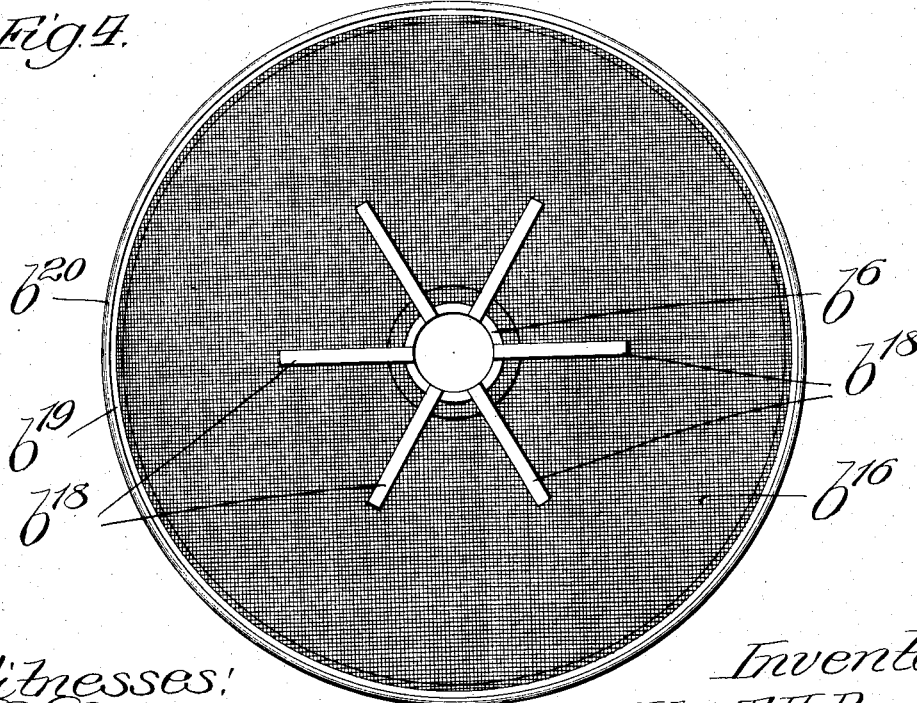

Figure 1 represents a broken sectional view of the improved filter, the section being taken as indicated at line 1 of Fig. 2; Fig. 2, a broken section taken as indicated at line 2 of Fig. 1, the various members employed in the filter being broken away to indicate more clearly the relation of the parts; Fig. 3, a view of one member of a collector element through which the liquor passes on its way to the central conduit of the filter; Fig. 4, a view of another member of the same collector element; Fig. 5, a broken view illustrating a detail of a flange or outer rim of the pan or casing of a filter-cell; Fig. 6, a broken bottom view of the same member; Fig. 7, a broken section taken as indicated at line 7 of Fig. 2 and showing a detail of the perforate bottom of the casing or pan of a filter-cell, and Fig. 8 a broken view illustrating the manner in which the two members of the collector element illustrated in Figs. 3 and 4 are joined together.

The filter comprises in its preferred embodiment a casing A, supplied with an inlet-passage $a$ near the periphery of its bottom and with an outlet $a'$ at the center of its bottom, and filter-cells B, contained in the casing and forming therewith an annular chamber B', the cells having a central conduit B², which communicates with the central outlet-passage $a'$ of the casing. The casing A may be of any approved construction. As shown, it comprises a cylinder $a^2$, externally flanged at its ends, and top and bottom ends $a^3$ $a^4$, respectively, detachably connected with the cylinder.

Each cell B comprises a comparatively hallow circular pan $b$, having a perforate bottom $b'$ and a peripheral flange $b^2$, a conduit-section $b^3$, fitted in a central perforation with which the perforate bottom is provided, a collector element $b^4$, having conduit-sections $b^5$ $b^6$ fitted in a central opening with which the collector element is provided, and filter material $b^7$ above and below the collector element $b^4$ and filling the pan $b$. The perforate bottom $b'$ is provided with radial corrugations $b^8$, as shown in Figs. 1 and 7. The peripheral portion $b^2$ of the pan $b$ is provided with an inturned flange $b^9$, upon which the peripheral portion of the perforate bottom rests and is secured and has a depending flange $b^{10}$, provided with radial grooves or passages $b^{11}$. (Best shown in Figs. 5 and 6.) Each conduit-section $b^3$ is provided externally, somewhat above its center, with a flange $b^{12}$, having on its upper surface an annular recess or groove $b^{13}$. The lower portion of the conduit-section $b^3$ extends through a central perforation with which the perforate bottom $b'$ is provided and is fitted with a bearing-ring $b^{14}$, between which and the flange $b^{12}$ the inner margin of the perforate bottom is secured. Each collector element $b^4$ comprises an upper screen $b^{15}$ and a lower screen $b^{16}$. (Shown separated in Figs. 3 and 4.) The conduit-sections $b^5$ $b^6$ are grooved on adjacent sides to provide an annular chamber $b^{17}$ between them, which receives the inner margins of the screens $b^{15}$ $b^{16}$. The lower screen $b^{16}$ is equipped with radial spacing members $b^{18}$, which serve to preserve a space between the screens. The lower screen is provided at its external periphery with a binding member $b^{19}$, having an upturned flange $b^{20}$, within which fits a binding member $b^{21}$, with which the upper screen $b^{15}$ is provided at its external periphery. The members $b^{19}$ $b^{21}$ are provided on adjacent sides with recesses $b^{22}$, which serve to receive the outer margins of the circular screens. This will be better understood by reference to Fig. 8. When the member $b^{21}$ is fitted within the flange $b^{20}$ of the member $b^{19}$, as shown in Fig. 1, the binding members are preferably joined as by soldering. The conduit-sections $b^5$ $b^6$, which constitute also inner binding members for the screens, may be joined together and to the inner margins of the screens by soldering the parts together. The spacing members $b^{18}$ extend between the conduit-sections $b^5$ $b^6$, so that passages leading to the central conduit $B^2$ of the filter are provided. The conduit-sections $b^5$ $b^6$ are provided on their unopposed surfaces with annular recesses or grooves $b^{23}$. The perforate radially-corrugated bottom of the lowermost cell-pan rests upon the bottom of the filter-casing, spaces being preserved therebetween for the admission of liquid beneath the cell-pan. The ring $b^{14}$ of the lowermost filter-pan bears upon a gasket $b^{24}$, which is slipped upon the conduit-section $b^3$ and bears upon the bottom of the filter. The conduit-sections $b^5$ $b^6$ telescope with the conduit-sections $b^3$, as shown. Over the top of the filter mass in each cell is placed a perforate top $b^{25}$. The drawings show a two-cell filter; but it will be understood that as many cells may be employed as are desired. Above the topmost cell and bearing against the lower surface of the casing-top $a^3$ is a radially-corrugated member $b^{26}$, equipped centrally with a conduit-section $b^{27}$, which telescopes with the conduit-section $b^5$ of the uppermost filter-cell and completes the central conduit at its upper end.

It will now be understood that when the filter parts are assembled as shown in Fig. 1 the liquor may pass from the annular chamber $B'$ through the grooves $b^{11}$ at the base portions of the filter-pans, thence through the perforate bottoms and tops of the filter-pans and through the filter masses to the collector elements $b^4$, through which the liquor escapes to the central conduit $B^2$. In practice filter material is confined between the flanges $b^{12}$ and the conduit-sections and the rings $b^{14}$, on the one hand, and the conduit-sections $b^5$ $b^6$, on the other hand, and tightly compacted in the grooves with which the members are provided, thereby preventing any free escape of the liquor to the central conduit except by way of the collector element. Opposed to the conduit-section $b^5$ of the upper collector element is a flange $b^{28}$, between which and said conduit-section the filter mass is compacted.

It will be understood that by reason of the telescopic connection between the conduit-sections at the center of the filter considerable latitude is allowed for compacting the filter masses in the cells when the parts are drawn together by means of bolts or by any other well-known means.

What I regard as new, and desire to secure by Letters Patent, is—

1. In a filter, the combination of a casing provided with an inlet and having a central outlet, and filter-cells within the casing and forming therewith an annular chamber, the filter-cells being constructed with telescoping central conduit-sections and external opposed surfaces at the conduit-sections with filter masses extending between and compacted between said opposed surfaces, for the purpose set forth.

2. In a filter, the combination of a casing and filter-cells therein, each filter-cell comprising a cell-pan having a perforate bottom and a conduit-section extending through the central portion of said bottom and provided externally between its ends with a flange, a collector element within said pan having a conduit-section connected with the center thereof and opposed to the flange on said first-named conduit section, said conduit-sections being telescopically connected, and a filter mass within the pan in which the collector element is embedded, for the purpose set forth.

3. In a filter, the combination of a casing provided with an inlet and having a central outlet, and cells within said casing and forming therewith an annular chamber, each cell comprising a cell-pan with a central conduit-section, a collector comprising suitably-spaced screens with conduit-sections connected with the inner margins thereof, said conduit-sections telescoping with the conduit-sections of the cell-pans, and filter material within each pan in which the collector element is embedded, the filter material extending into and compacted within the space between said flange and the opposed conduit-section, for the purpose set forth.

4. In a filter, the combination of a casing having an inlet and a central outlet, and filter-cells within said casing, each cell comprising a cell-pan having a perforate bottom, a conduit-section extending through a central opening in said bottom and equipped between its ends with an external recessed flange, a collector element comprising suitably-spaced screens equipped with conduit-sections, the conduit-sections of the collector element telescoping with the conduit-sections of the cell-pan bottoms, and having recesses for receiving filter material, and filter material filling the cell-pan and in which the collector element is embedded, the filter material extending into and compacted within the spaces between said flanges and the opposed conduit-sections, for the purpose set forth.

5. In a filter, the combination of a casing having an inlet and a central outlet, a filter-pan having a perforate radially-corrugated bottom resting upon the bottom of the casing and having a central conduit-section extending into the central outlet of the casing, said filter-pan having a rim extending above the bottom of the pan and a flange extending below the bottom of the pan and provided with passages, an external flange on said conduit-section, a collector element within said pan equipped with conduit-sections with a space therebetween for the passage of liquid into the central conduit, the lowermost one of said last-named conduit-sections telescoping with said first-named conduit-section, filter material filling said cell-pan and in which said collector element is embedded, said filter material extending across the conduit-sections of said collector element, and a superposed filter-cell having a conduit-section extending into the upper conduit-section of said collector element and equipped with an external flange, for the purpose set forth.

6. In a filter, the combination of a casing having an inlet and a central outlet, and filter-cells within said casing and forming therewith an annular chamber, each filter-cell comprising a cell-pan having a perforate bottom equipped with a rim and with a depending grooved flange at the periphery of said bottom, a conduit-section extending through a central opening in said bottom and equipped with an external flange, the lowermost conduit-section telescoping with the central outlet-opening of the casing, a collector element in each cell-pan equipped with conduit-sections telescoping with the conduit-sections with which the cell-pan bottoms are provided, filter material filling the cell-pans and in which the collector elements are embedded, and perforate tops for the filter-pans.

7. A cell-pan for a filter, comprising a radially-corrugated perforate bottom having a central opening, an externally-flanged conduit-section extending through said central opening and a rim connected with the outer periphery of said bottom and having a depending flange provided with radial passages, for the purpose set forth.

8. A collector element for a filter comprising a pair of annular screens, spacing members between the screens, conduit-sections connected with the inner margins of the screens, and binding means joining the outer margins of the screens.

9. A collector element for filters, comprising a pair of annular screens, conduit-sections joined to the inner margins of the screens, and a pair of ring-form binding members connecting the outer margins of the screens, one of said binding members being recessed to receive the other, for the purpose set forth.

10. In a filter, the combination of a casing having an inlet and a central outlet at its bottom, a filter-pan having a radially-corrugated perforate bottom resting upon the bottom of the casing and equipped with a central conduit-section telescoping with the central outlet-opening of the casing and having an external flange, a gasket between said flange and the bottom of the casing, a collector element within said cell-pan having a conduit-section telescoping with said first-named conduit-section, filter material within the pan in which said collector element is embedded, a similarly-constructed superposed cell having a conduit-section telescopically connected with the conduit-section of said collector element, and a radially-corrugated member bearing against the top of said casing and equipped with a conduit-section telescoping with a conduit-section of the adjacent collector element of the adjacent cell, for the purpose set forth.

JOHN T. H. PAUL.

In presence of—
A. U. THORIEN,
J. H. LANDES.